United States Patent
Ledlie et al.

(10) Patent No.: US 9,069,003 B2
(45) Date of Patent: Jun. 30, 2015

(54) METHODS, APPARATUSES AND COMPUTER PROGRAM PRODUCTS FOR DETERMINING SPEED OF MOVEMENT OF A DEVICE AND DEVICE POSE CLASSIFICATION

(75) Inventors: Jonathan Ledlie, Cambridge, MA (US); Jun-geun Park, Cambridge, MA (US); Ami Mukesh Patel, Trabuco Canyon, CA (US); Dorothy Curtis, Framingham, MA (US); Seth Teller, Cambridge, MA (US)

(73) Assignees: Nokia Corporation, Espoo (FI); Massachusetts Institute of Technology, Cambridge, MA (US)

( * ) Notice: Subject to any disclaimer, the term of this patent is extended or adjusted under 35 U.S.C. 154(b) by 560 days.

(21) Appl. No.: 13/458,580

(22) Filed: Apr. 27, 2012

(65) Prior Publication Data
US 2013/0289931 A1    Oct. 31, 2013

(51) Int. Cl.
*G06F 19/00*    (2011.01)
*G01P 3/60*    (2006.01)

(52) U.S. Cl.
CPC ........................................ *G01P 3/60* (2013.01)

(58) Field of Classification Search
CPC .......................... A61B 5/11; A61B 2562/0219
USPC .......................... 702/141, 150, 155, 182–185
See application file for complete search history.

(56) References Cited

U.S. PATENT DOCUMENTS

2012/0271121 A1* 10/2012 Della Torre et al. .......... 600/301

OTHER PUBLICATIONS

Park, Jun-Geun, et al., "Online Pose Classification and Walking Speed Estimation Using Handheld Devices," The 14th ACM International Conference on Ubiquitous Computing (Ubicomp 2012), Sep. 5-8, 2012, 10 pages, Pittsburgh.

* cited by examiner

*Primary Examiner* — Edward Raymond
(74) *Attorney, Agent, or Firm* — Alston & Bird LLP

(57) ABSTRACT

An apparatus for determining a speed of cyclic motion of a device or user and one or more poses of a device may include a processor and memory storing executable computer code causing the apparatus to at least perform operations including receiving one or more determined acceleration values during one or more time periods in response to detected cyclic motion of a user moving with an apparatus. The computer program code may further cause the apparatus to transform the acceleration values to one or more corresponding frequency components associated with the acceleration values. The computer program code may further cause the apparatus to determine a speed of the cyclic motion of the user based in part on comparing a spectrum of the frequency components to one or more spectrums of distribution associated with respective one or more speeds of training data. Corresponding methods and computer program products are also provided.

20 Claims, 3 Drawing Sheets

METHODS, APPARATUSES AND COMPUTER PROGRAM PRODUCTS FOR DETERMINING SPEED OF MOVEMENT OF A DEVICE AND DEVICE POSE CLASSIFICATION

TECHNOLOGICAL FIELD

An example embodiment of the invention relates generally to activity recognition and context aware behavior of communication devices and more particularly, relates to a method, apparatus, and computer program product for estimating speed of movement of communication devices and classifying one or more device poses for communication devices.

BACKGROUND

The modern communications era has brought about a tremendous expansion of wireline and wireless networks. Computer networks, television networks, and telephony networks are experiencing an unprecedented technological expansion, fueled by consumer demand. Wireless and mobile networking technologies have addressed related consumer demands, while providing more flexibility and immediacy of information transfer.

Current and future networking technologies continue to facilitate ease of information transfer and convenience to users. Due to the now ubiquitous nature of electronic communication devices, people of all ages and education levels are utilizing electronic devices to communicate with other individuals or contacts, receive services and/or share information, media and other content. One area in which there is a demand to increase ease of information transfer relates to context-aware behavior services of communication devices. These context-aware behavior services may be utilized to determine activity recognition such as current activity of a user and/or communication device. Determining with confidence specific aspects of device pose and user motion may provide a foundation for context inference. As such, speed estimation and pose classification of a communication device may be beneficial for activity recognition. For example, speed estimation and pose classification information may be utilized by a communication device to determine that a person walking briskly with the communication device in a pocket is likely not also drinking a cup of coffee.

By determining a user's walking speed based on speed estimation information, a route-finding application of a mobile device may better estimate location. Additionally, pose classifications of a mobile device may be exposed to applications of the mobile device allowing the applications to determine whether certain features should be computed or displayed. For example, an application may reduce its energy consumption by deferring activity that would only be relevant if the user were looking at the mobile device while it was in the user's hand. As people expect more context-aware behavior from their mobile devices, seamlessly inferring their current activity has emerged as a relevant challenge.

Due to recent advances in sensor technology, many current mobile devices are equipped with sensors that may be used to capture user motion data and infer user activities and context. However, existing solutions relating to user context recognition using acceleration typically assumes that one or more sensors are attached to known positions on the body of the user (e.g., a chest or hip), or assumes that the mobile device, such as a mobile phone, was in a known, fixed position (e.g., a pocket).

However, these assumptions may not match normal users' typical usage patterns such as, for example, people carrying their mobile phone in different places at different times, sometimes rapidly changing its position.

In view of the foregoing drawbacks, it may be beneficial to provide an efficient and reliable mechanism of determining speed of movement of a device and device pose classifications.

BRIEF SUMMARY

A method, apparatus and computer program product are therefore provided for utilizing accelerometer-based mechanisms for determining speed of movement of a device and device pose classification of one or more communication devices. The speed estimation may relate to a speed of a cyclic motion (e.g., walking speed) of a user of a communication device(s). In this regard, an example embodiment may provide mechanisms for determining speed estimation (e.g., walking speed estimation) and one or more device pose classifications that do not necessarily assume a fixed, known sensor orientation and placement which are typically utilized by existing solutions.

An example embodiment of the invention may enable a communication device to estimate cyclic motion speed (e.g., walking speed, running speed, etc.) and classifying one or more device poses for a communication device of a user(s) based in part on utilizing time-series acceleration data received from a sensor such as, for example, an accelerometer (e.g., a single triaxial accelerometer). As described above, in contrast to current and previous approaches, an example embodiment of the invention may not necessarily assume that sensors are placed at fixed, known positions on the body of a user. Instead, an example embodiment may classify one or more device poses that may be utilized in a user's everyday/normal usage. In order to predict or estimate the speed of cyclic motion (e.g., walking speed) of a user and a device pose(s) under various combinations of user speed and poses, an example embodiment may apply one or more regularized kernel mechanisms to estimate the speed and determine the device pose(s). The regularized kernel mechanisms may include but are not limited to a regularized least squares technique utilized in part for determining speed estimation, and a support vector machine(s) utilized in part for determining device pose classifications.

By performing one or more tests and analyzing the test data, an example embodiment detected speed estimates (e.g., cyclic motion speed estimation (e.g., walking speed estimation)) with an error of less than 8% and the device pose estimation was about 95% accurate as compared to the true speed and the true device pose. As such, an example embodiment may provide high predictive performance and accuracy for determining speed estimation and device pose.

In one example embodiment, a method for determining a speed of cyclic motion of a device or user and one or more poses of a device is provided. The method may include receiving one or more determined acceleration values during one or more time periods in response to detected cyclic motion of a user moving with an apparatus. The method may further include transforming the acceleration values to one or more corresponding frequency components associated with the acceleration values. The method may further include determining a speed of the cyclic motion of the user based in part on comparing a spectrum of the frequency components to one or more spectrums of distribution associated with respective one or more speeds of training.

In another example embodiment, an apparatus for determining a speed of cyclic motion of a device or user and one or more poses of a device is provided. The apparatus may include a processor and a memory including computer program code. The memory and computer program code are configured to, with the processor, cause the apparatus to at least perform operations including receiving one or more determined acceleration values during one or more time periods in response to detected cyclic motion of a user moving with the apparatus. The memory and computer program code are further configured to, with the processor, cause the apparatus to transform the acceleration values to one or more corresponding frequency components associated with the acceleration values. The memory and computer program code are further configured to, with the processor, cause the apparatus to determine a speed of the cyclic motion of the user based in part on comparing a spectrum of the frequency components to one or more spectrums of distribution associated with respective one or more speeds of training data.

In another example embodiment, a computer program product for determining a speed of cyclic motion of a device or user and one or more poses of a device is provided. The computer program product includes at least one computer-readable storage medium having computer-readable program code portions stored therein. The computer-executable program code instructions may include program code instructions configured to cause receipt of one or more determined acceleration values during one or more time periods in response to detected cyclic motion of a user moving with an apparatus. The program code instructions may also transform the acceleration values to one or more corresponding frequency components associated with the acceleration values. The program code instructions may also determine a speed of the cyclic motion of the user based in part on comparing a spectrum of the frequency components to one or more spectrums of distribution associated with respective one or more speeds of training data.

BRIEF DESCRIPTION OF THE SEVERAL VIEWS OF THE DRAWINGS

Figure 1:
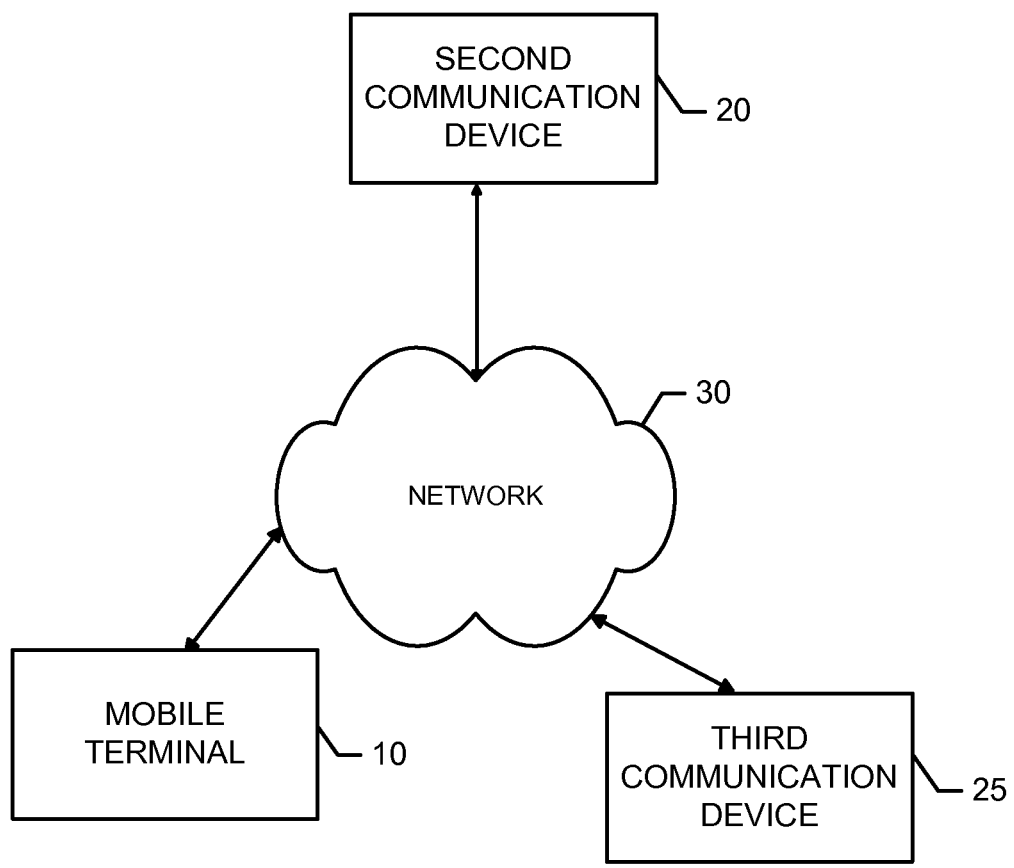
Figure 2:
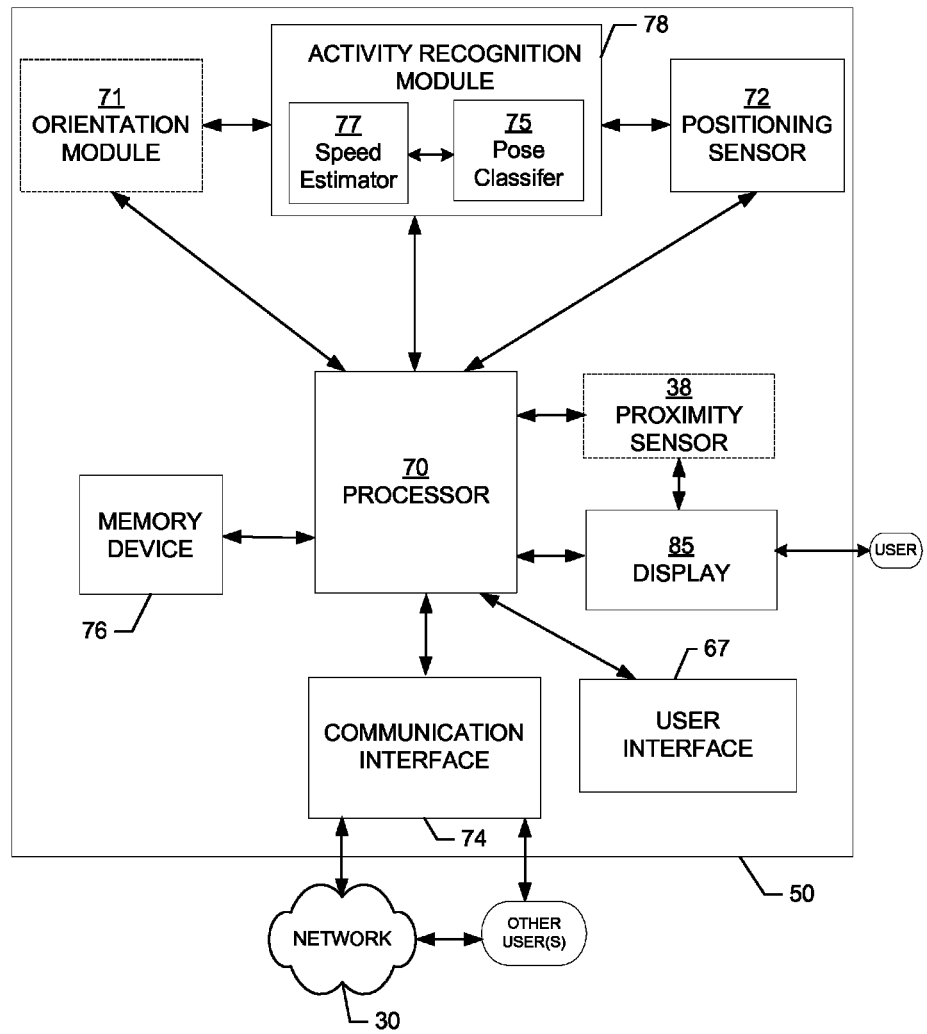
Figure 3:
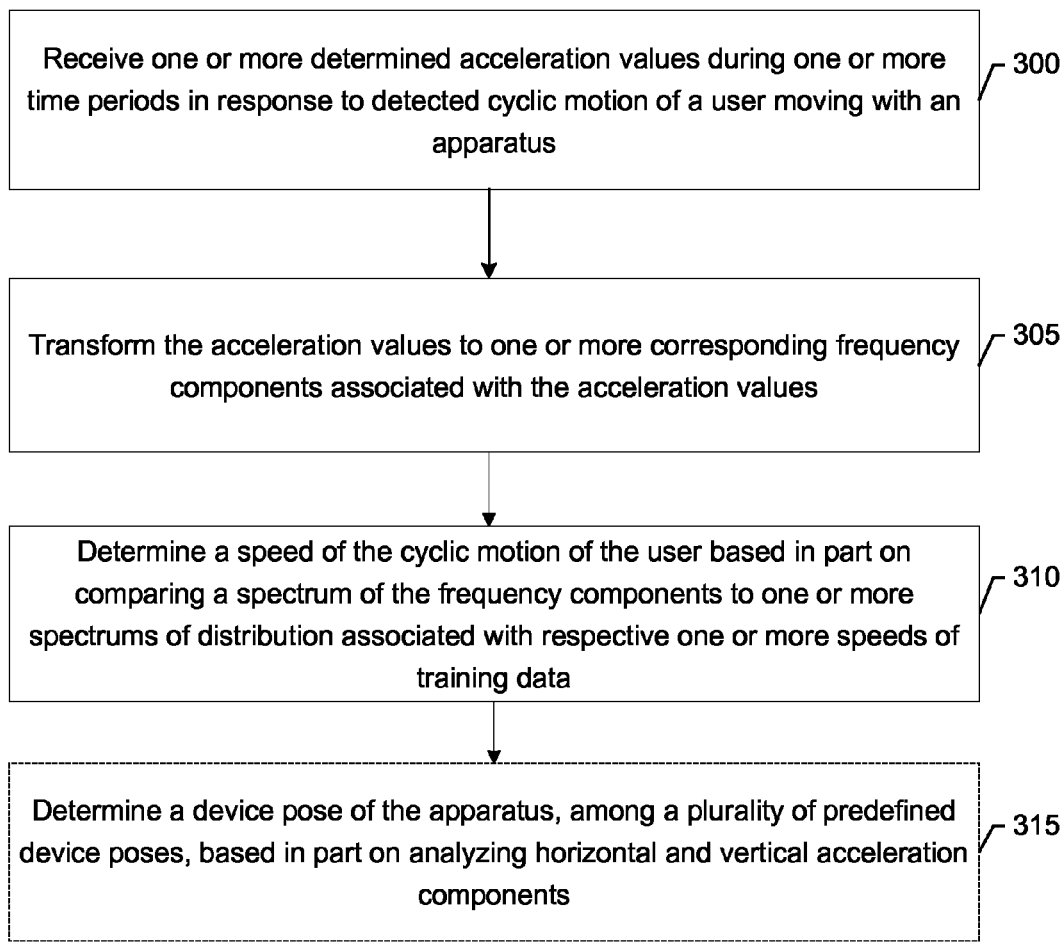

Having thus described the invention in general terms, reference will now be made to the accompanying drawings, which are not necessarily drawn to scale, and wherein:

FIG. 1 is a schematic block diagram of a system according to an example embodiment of the invention;

FIG. 2 is a schematic block diagram of an apparatus according to an example embodiment of the invention; and FIG. 3 illustrates a flowchart for determining a speed of cyclic motion of a device or user and one or more poses of a device according to an example embodiment of the invention.

DETAILED DESCRIPTION

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein. Like reference numerals refer to like elements throughout. As used herein, the terms "data," "content," "information" and similar terms may be used interchangeably to refer to data capable of being transmitted, received and/or stored in accordance with embodiments of the present invention. Moreover, the term "exemplary", as used herein, is not provided to convey any qualitative assessment, but instead merely to convey an illustration of an example. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein a "computer-readable storage medium," which refers to a non-transitory, physical or tangible storage medium (e.g., volatile or non-volatile memory device), may be differentiated from a "computer-readable transmission medium," which refers to an electromagnetic signal.

As referred to herein, a device pose(s) may denote an orientation, location and/or placement of a communication device in relation to a user while the user carries the communication device. In this regard, the placements may relate to poses in which people usually carry a communication device (e.g., a mobile device (e.g., a mobile phone), etc.). The poses may be categorized as device poses. For example, while browsing content, users may typically hold a communication device in a hand. When placing a call, users may typically place the communication device near an ear. When carrying a communication device without interacting with the communication device, users may typically place the communication device either in a pocket or a bag. As such, one or more device poses of an example embodiment may include, but are not limited to, an in hand device pose, an in pocket device pose, an in bag device pose, a held to ear device pose or any other suitable device poses.

As referred to herein, the term walking speed(s) may denote a speed in which a user walks with a communication device.

FIG. 1 illustrates a generic system diagram in which a device such as a mobile terminal 10 is shown in an example communication environment. As shown in FIG. 1, an embodiment of a system in accordance with an example embodiment of the invention may include a first communication device (e.g., mobile terminal 10) and a second communication device 20 capable of communication with each other via a network 30. In some cases, an embodiment of the present invention may further include one or more additional communication devices, one of which is depicted in FIG. 1 as a third communication device 25. In one embodiment, not all systems that employ an embodiment of the present invention may comprise all the devices illustrated and/or described herein. While an embodiment of the mobile terminal 10 and/or or second and third communication devices 20 and 25 may be illustrated and hereinafter described for purposes of example, other types of terminals, such as portable digital assistants (PDAs), pagers, mobile televisions, mobile telephones, gaming devices, laptop computers, cameras, video recorders, audio/video players, radios, global positioning system (GPS) devices, Bluetooth headsets, Universal Serial Bus (USB) devices or any combination of the aforementioned, and other types of voice and text communications systems, can readily employ an embodiment of the present invention. Furthermore, devices that are not mobile, such as servers and personal computers may also readily employ an embodiment of the present invention.

The network 30 may include a collection of various different nodes (of which the second and third communication devices 20 and 25 may be examples), devices or functions that may be in communication with each other via corresponding wired and/or wireless interfaces. As such, the illustration of FIG. 1 should be understood to be an example of a broad view of certain elements of the system and not an all-inclusive or detailed view of the system or the network 30. Although not necessary, in one embodiment, the network 30 may be capable of supporting communication in accordance with any one or more of a number of First-Generation (1G), Second-Generation (2G), 2.5G, Third-Generation (3G), 3.5G, 3.9G, Fourth-Generation (4G) mobile communication protocols, Long Term Evolution (LTE) or Evolved Universal Terrestrial Radio Access Network (E-UTRAN), Self Optimizing/Organizing Network (SON) intra-LTE, inter-Radio Access Technology (RAT) Network and/or the like. In one embodiment, the network 30 may be a point-to-point (P2P) network.

One or more communication terminals such as the mobile terminal 10 and the second and third communication devices 20 and 25 may be in communication with each other via the network 30 and each may include an antenna or antennas for transmitting signals to and for receiving signals from one or more base sites. The base sites could be, for example one or more base stations (BS) that is a part of one or more cellular or mobile networks or one or more access points (APs) that may be coupled to a data network, such as a Local Area Network (LAN), Wireless Local Area Network (WLAN), a Metropolitan Area Network (MAN), and/or a Wide Area Network (WAN), such as the Internet. In turn, other devices such as processing elements (e.g., personal computers, server computers or the like) may be coupled to the mobile terminal 10 and the second and third communication devices 20 and 25 via the network 30. By directly or indirectly connecting the mobile terminal 10 and the second and third communication devices 20 and 25 (and/or other devices) to the network 30, the mobile terminal 10 and the second and third communication devices 20 and 25 may be enabled to communicate with the other devices or each other. For example, the mobile terminal 10 and the second and third communication devices 20 and 25 as well as other devices may communicate according to numerous communication protocols including Hypertext Transfer Protocol (HTTP) and/or the like, to thereby carry out various communication or other functions of the mobile terminal 10 and the second and third communication devices 20 and 25, respectively.

Furthermore, although not shown in FIG. 1, the mobile terminal 10 and the second and third communication devices 20 and 25 may communicate in accordance with, for example, radio frequency (RF), near field communication (NFC), Bluetooth (BT), Infrared (IR) or any of a number of different wireline or wireless communication techniques, including Local Area Network (LAN), Wireless LAN (WLAN), Worldwide Interoperability for Microwave Access (WiMAX), Wireless Fidelity (Wi-Fi), Ultra-Wide Band (UWB), Wibree techniques and/or the like. As such, the mobile terminal 10 and the second and third communication devices 20 and 25 may be enabled to communicate with the network 30 and each other by any of numerous different access mechanisms. For example, mobile access mechanisms such as Wideband Code Division Multiple Access (W-CDMA), CDMA2000, Global System for Mobile communications (GSM), General Packet Radio Service (GPRS) and/or the like may be supported as well as wireless access mechanisms such as WLAN, WiMAX, and/or the like and fixed access mechanisms such as Digital Subscriber Line (DSL), cable modems, Ethernet and/or the like.

In an example embodiment, the first communication device (e.g., the mobile terminal 10) may be a mobile communication device such as, for example, a wireless telephone or other devices such as a personal digital assistant (PDA), mobile computing device, camera, video recorder, audio/video player, positioning device, game device, television device, radio device, or various other like devices or combinations thereof. The second communication device 20 and the third communication device 25 may be mobile or fixed communication devices. However, in one example, the second communication device 20 and the third communication device 25 may be servers, remote computers or terminals such as personal computers (PCs) or laptop computers.

In an example embodiment, the network 30 may be an ad hoc or distributed network arranged to be a smart space. Thus, devices may enter and/or leave the network 30 and the devices of the network 30 may be capable of adjusting operations based on the entrance and/or exit of other devices to account for the addition or subtraction of respective devices or nodes and their corresponding capabilities.

In an example embodiment, the mobile terminal as well as the second and third communication devices 20 and 25 may employ an apparatus (e.g., apparatus of FIG. 2) capable of employing an embodiment of the invention.

FIG. 2 illustrates a schematic block diagram of an apparatus according to an example embodiment. An example embodiment of the invention will now be described with reference to FIG. 2, in which certain elements of an apparatus 50 are displayed. The apparatus 50 of FIG. 2 may be employed, for example, on the mobile terminal 10 (and/or the second communication device 20 or the third communication device 25). Alternatively, the apparatus 50 may be embodied on a network device of the network 30. However, the apparatus 50 may alternatively be embodied at a variety of other devices, both mobile and fixed (such as, for example, any of the devices listed above). In some cases, an embodiment may be employed on a combination of devices. Accordingly, one embodiment of the invention may be embodied wholly at a single device (e.g., the mobile terminal 10), by a plurality of devices in a distributed fashion (e.g., on one or a plurality of devices in a P2P network) or by devices in a client/server relationship. Furthermore, it should be noted that the devices or elements described below may not be mandatory and thus some may be omitted in a certain embodiment.

Referring now to FIG. 2, the apparatus 50 may include or otherwise be in communication with a processor 70, a user interface 67, a communication interface 74, a memory device 76, a display 85, an activity recognition module 78, a positioning sensor 72, an optional orientation module 71, and an optional proximity sensor 38. The activity recognition module 78 may include a speed estimator 77 and a pose classifier 75. In one example embodiment, the display 85 may be a touch screen display. The memory device 76 may include, for example, volatile and/or non-volatile memory. For example, the memory device 76 may be an electronic storage device (e.g., a computer readable storage medium) comprising gates configured to store data (e.g., bits) that may be retrievable by a machine (e.g., a computing device like processor 70). In an example embodiment, the memory device 76 may be a tangible memory device that is not transitory. The memory device 76 may be configured to store information, data, files, applications, instructions or the like for enabling the apparatus to carry out various functions in accordance with an example embodiment of the invention. For example, the memory device 76 could be configured to buffer input data for processing by the processor 70. Additionally or alternatively, the memory device 76 could be configured to store instructions for execution by the processor 70. As yet another alternative, the memory device 76 may be one of a plurality of databases that store information and/or media content (e.g., pictures, videos, etc.). Additionally, the memory device 76 may store acceleration data, device pose data (e.g., a pose of the apparatus 50, one or more speed estimates and any other suitable data.

The apparatus 50 may, in one embodiment, be a mobile terminal (e.g., mobile terminal 10) or a fixed communication device or computing device configured to employ an example embodiment of the invention. However, in one embodiment, the apparatus 50 may be embodied as a chip or chip set. In other words, the apparatus 50 may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus 50 may therefore, in some cases, be configured to implement an embodiment of the invention on a single chip or as a single "system on a chip." As such, in some cases, a chip or chipset may constitute means for performing one or more operations for providing the functionalities described herein. Additionally or alternatively, the chip or chipset may constitute means for enabling user interface navigation with respect to the functionalities and/or services described herein.

The processor 70 may be embodied in a number of different ways. For example, the processor 70 may be embodied as one or more of various processing means such as a coprocessor, microprocessor, a controller, a digital signal processor (DSP), processing circuitry with or without an accompanying DSP, or various other processing devices including integrated circuits such as, for example, an ASIC (application specific integrated circuit), an FPGA (field programmable gate array), a microcontroller unit (MCU), a hardware accelerator, a special-purpose computer chip, or the like. In an example embodiment, the processor 70 may be configured to execute instructions stored in the memory device 76 or otherwise accessible to the processor 70. As such, whether configured by hardware or software methods, or by a combination thereof, the processor 70 may represent an entity (e.g., physically embodied in circuitry) capable of performing operations according to an embodiment of the invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70 to perform the algorithms and operations described herein when the instructions are executed. However, in some cases, the processor 70 may be a processor of a specific device (e.g., a mobile terminal or network device) adapted for employing an embodiment of the invention by further configuration of the processor 70 by instructions for performing the algorithms and operations described herein. The processor 70 may include, among other things, a clock, an arithmetic logic unit (ALU) and logic gates configured to support operation of the processor 70.

In an example embodiment, the processor 70 may be configured to operate a connectivity program, such as a browser, Web browser or the like. In this regard, the connectivity program may enable the apparatus 50 to transmit and receive Web content, such as for example location-based content or any other suitable content, according to a Wireless Application Protocol (WAP), for example.

Meanwhile, the communication interface 74 may be any means such as a device or circuitry embodied in either hardware, a computer program product, or a combination of hardware and software that is configured to receive and/or transmit data from/to a network and/or any other device or module in communication with the apparatus 50. In this regard, the communication interface 74 may include, for example, an antenna (or multiple antennas) and supporting hardware and/or software for enabling communications with a wireless communication network (e.g., network 30). In fixed environments, the communication interface 74 may alternatively or also support wired communication. As such, the communication interface 74 may include a communication modem and/or other hardware/software for supporting communication via cable, digital subscriber line (DSL), universal serial bus (USB), Ethernet or other mechanisms.

The user interface 67 may be in communication with the processor 70 to receive an indication of a user input at the user interface 67 and/or to provide an audible, visual, mechanical or other output to the user. As such, the user interface 67 may include, for example, a keyboard, a mouse, a joystick, a display, a touch screen, a microphone, a speaker, or other input/output mechanisms. In an example embodiment in which the apparatus is embodied as a server or some other network devices, the user interface 67 may be limited, remotely located, or eliminated. The processor 70 may comprise user interface circuitry configured to control at least some functions of one or more elements of the user interface, such as, for example, a speaker, ringer, microphone, display, and/or the like. The processor 70 and/or user interface circuitry comprising the processor 70 may be configured to control one or more functions of one or more elements of the user interface through computer program instructions (e.g., software and/or firmware) stored on a memory accessible to the processor 70 (e.g., memory device 76, and/or the like).

In addition, the apparatus 50 may include a positioning sensor 72. The positioning sensor 72 may be any means such as a device or circuitry embodied in either hardware or a combination of hardware and software that is configured to determine the speed, velocity or acceleration of the apparatus 50 as well as a position(s) or location(s) of the apparatus 50. The positioning sensor 72 may determine the speed and acceleration in which the apparatus 50 is moving or traveling along a path or route, for example through timed location updates. For instance, the positioning sensor 72 is configured to determine the speed and acceleration in which the apparatus 50 is traveling based on changes in position at respective times. In this regard, the positioning sensor 72 is configured to determine the time that it takes the apparatus 50 to move from a first location to a second or subsequent location in order to determine the speed in which the apparatus 50 is moving or travelling. In an example embodiment, the positioning sensor 72 may include a motion detection unit such as, for example, an accelerometer (e.g., with associated algorithms) for obtaining the speed in which the apparatus 50 is traveling or moving. The movement may, but need not, be cyclic movement (also referred to herein as cyclic motion). In one example embodiment, the cyclic movement may correspond to movement of a user walking with the apparatus 50. The positioning sensor 72 may also determine an instance in which the apparatus 50 is stationary, idle, motionless or at rest. The positioning sensor 72 may determine that the apparatus is stationary, idle, motionless or at rest in an instance in which the positioning sensor 72 determines that the speed, velocity or acceleration of the apparatus 50 is zero. In an example embodiment, the speed and/or acceleration determined by the positioning sensor 72 may be utilized as additional training data for determining speed of movement of the apparatus 50 in other (e.g., future) instances.

Additionally, the positioning sensor 72 may optionally include, for example, a global positioning system (GPS) sensor, an assisted global positioning system (Assisted-GPS) sensor, a Bluetooth (BT)-GPS mouse, other GPS or positioning receivers or the like. However, in one example embodiment, the positioning sensor 72 may include a pedometer or inertial sensor. In this regard, the positioning sensor 72 may be capable of determining a location of the apparatus 50, such as, for example, longitudinal and latitudinal directions of the apparatus 50, or a position relative to a reference point such as a destination or start point. The positioning sensor 72 may also be capable of determining an altitude of the apparatus 50 and use the altitude information in determining the location of the apparatus 50. Information from the positioning sensor 72 may then be communicated to a memory of the apparatus 50 or to another memory device to be stored as a position history or location information. In this regard, for example, the position history may define a series of data points corresponding to positions or locations of the apparatus 50 at respective times. Various events or activities of the apparatus 50 may also be recorded in association with position history or location information provided by the positioning sensor 72.

In an example embodiment, the apparatus 50 may further include (or be in communication with) an optional orientation module 71. The orientation module 71 may be any means such as a device or circuitry embodied in either hardware or a combination of hardware and software that is configured to determine the orientation of apparatus 50.

The orientation module 71 may be configured to determine the orientation of apparatus 50 relative to a reference. In some cases, the reference may be a particular direction, such as North or another cardinal direction. However, other references may also be employed. As such, in one embodiment, the orientation module 71 may include a gyroscope or other orientation sensor, such as, for example, a compass, configured to determine the heading of the apparatus 50 or direction that apparatus 50 is pointing or being turned. The direction or heading may be determined in terms of degrees (e.g., 0 to 360 degrees) offset from the reference. In some cases, the reference may be fixed (e.g., a fixed directional reference), while in other cases, the reference may be a reference of opportunity such as an initial orientation.

The orientation module 71 may be configured to determine the orientation of the apparatus 50 based on a speed or amount of movement relative to a reference. While one embodiment may only determine orientation in a single plane (e.g., parallel to the surface of the earth), another embodiment may allow for orientation determination including an elevation aspect and/or axial aspect shifts. Thus, for example, the orientation module 71 may be configured to determine pitch and/or yaw of the apparatus 50 (e.g., pitch defining a degree of elevation and yaw defining an axial rotation). As such, for example, the orientation module 71 may include a device or other means for determining the orientation of the apparatus 50, which may be referred to as orientation information. In one embodiment, the orientation module 71 may include a gyroscope, an electronic/digital compass, a gravity sensor and/or the like or any other sensor that may be useful in determining orientation information.

The orientation module 71 may be configured to determine the orientation of the apparatus 50 based on a speed or amount of movement relative to a reference. While one embodiment may only determine orientation in a single plane (e.g., parallel to the surface of the earth), another embodiment may allow for orientation determination including an elevation aspect and/or axial aspect shifts.

The apparatus 50 may further include (or be in communication with) an optional proximity sensor 38. The proximity sensor 38 may be a sensor device (e.g., a light sensor (e.g., a photosensor, a photodetector)) capable of detecting the presence of one or more nearby objects (e.g., an ear, a hand, a cheek, etc.) even in instances in which there may not necessarily be any physical contact objects. In one example embodiment, the proximity sensor 38 may emit an electromagnetic field or a beam of electromagnetic radiation (for example, infrared) and may detect changes in the electromagnetic field or a return signal to identify an object(s) within a proximity of the proximity sensor 38. The object(s) being sensed by the proximity sensor 38 may referred herein as the target of the proximity sensor 38.

In an example embodiment, the processor 70 may be embodied as, include or otherwise control the activity recognition module 78. The activity recognition module 78 may be any means such as a device or circuitry operating in accordance with software or otherwise embodied in hardware or a combination of hardware and software (e.g., processor 70 operating under software control, the processor 70 embodied as an ASIC or FPGA specifically configured to perform the operations described herein, or a combination thereof) thereby configuring the device or circuitry to perform the corresponding functions of the activity recognition module 78, as described below. Thus, in an example in which software is employed, a device or circuitry (e.g., the processor 70 in one example) executing the software forms the structure associated with such means.

The activity recognition module 78 may utilize a speed estimator 77 to estimate or determine cyclic movement speed such as, for example, walking speed and may utilize the pose classifier 75 to detect one or more poses of the apparatus 50. In an example embodiment, the speed estimator 77 and/or processor 70 may utilize or implement a regularized least squares (RLS) algorithm or computer program (e.g., computer code, software instructions) to determine the cyclic movement speed (e.g., walking speed).

The RLS may be a supervised program and in this regard, the RLS may be trained with training data associated with acceleration data of several users/persons moving (e.g., walking) with a communication device (e.g., apparatus 50). In this regard, the RLS may utilize the training data to predict or estimate the acceleration for a new user moving (e.g., walking) with an apparatus 50. For example, several items of training data may be obtained for users moving cyclically (e.g., walking) with a communication device (e.g., an apparatus 50) at different speeds (e.g., 1 mile per hour (mph), 2 mph, 3 mph, etc.) and this training data may be provided to the RLS so that the RLS may predict, upon execution by the speed estimator 77 and/or processor 70, the acceleration/speed of a new user, being considered, that moves with a communication device. In this regard, the RLS upon execution by the speed estimator 77 and/or processor 70, may determine an acceleration/speed (e.g., 2 mph) of the new user based on a spectrum distribution of an acceleration signal corresponding to the acceleration/speed that more closely matches a corresponding acceleration/speed (e.g., 2 mph) of the training data.

In response to the RLS being executed by the speed estimator 77 and/or processor 70, the RLS may also interpolate a speed detected for a new user being considered. For purposes of illustration and not of limitation, in an instance in which the training data corresponds to 1 mph, 2 mph, or 3 mph and the acceleration/speed of the new user does not exactly match the speeds of the training data, the RLS may interpolate between the speeds of the training data to predict/estimate a speed. For example, in an instance in which the acceleration signal associated with the movement (e.g., walking) of the new user does not exactly match the 1 mph or 2 mph speeds of the training data, the RLS, when executed by the speed estimator 77 and/or processor 70, may interpolate between the 1 mph and 2 mph speeds and determine that the speed of the new user is 1.5 mph.

In addition, in one example embodiment, the pose classifier 75 may utilize or implement a support vector machine(s) (SVM) (e.g., an algorithm, a computer program (e.g., computer code, software instructions)). In response to being executed by the pose classifier 75 and/or processor 70, the SVM may analyze data (e.g., training data) and recognize patterns, utilized for classification (e.g., pose classification). In this regard, the pose classifier 75 and/or processor 70 may implement or execute the SVM to categorize accelerometer input as originating from one or more distinct device poses (e.g., an in hand device pose, an in pocket device pose, an in bag device pose, a held to ear device pose, etc.). In an example embodiment, the SVM may be trained with training data associated with one or more device poses detected in instances in which users move with a communication device (e.g., apparatus 50) that is in at least one of the different device poses. In an instance in which an acceleration signal corresponding to acceleration of a new user moving (e.g., walking) with a communication device (e.g., apparatus 50) is analyzed by the pose classifier 75, upon executing the SVM, the pose classifier 75 may select a corresponding device pose (e.g., an in hand device pose) corresponding to the apparatus 50 of the new user that most closely matches or resembles a device pose of the training data.

The activity recognition module 78 may utilize time-series acceleration signals received from an accelerometer (e.g., triaxial accelerometer) of the positioning sensor 72 and may extract one or more features, including but not limited to, spectral magnitudes, signal energy, and gravity features, from the acceleration signals, as described more fully below.

For example, in an instance in which a user of the apparatus 50 moves cyclically (e.g., walks) with the apparatus 50, the accelerator of the positioning sensor 72 may generate one or more acceleration signals (also referred to herein as time-series acceleration signals) associated with the acceleration of the user's movement. The accelerator of the positioning sensor 72 may provide the acceleration signals to the speed estimator 77 of the activity recognition module 78. In this regard, the speed estimator 77 may extract features from the time-series acceleration signals by partitioning each of the signals into a sliding-window of samples with an overlap between subsequent windows. For purposes of illustration and not of limitation, the speed estimator 77 may extract features from the time-series acceleration signals by partitioning each of the signals into a sliding-window of 512 samples with 50% overlap between subsequent windows. However, any other suitable sliding-window(s) of samples and overlap between subsequent windows may be utilized without departing from the spirit and scope of the invention.

For purposes of illustration and not of limitation, presume that speed estimator 77 utilizes a sampling rate of 100 Hz. In this regard, each window may correspond to a time period of 5.12 seconds. In other words, for every one-hundredth of a second, the accelerometer of the positioning sensor 72 may detect an acceleration reading. The reading may be an x, y, z acceleration value(s) corresponding to movement (e.g., walking) of the user with the apparatus 50. As such, the accelerometer of the positioning sensor 72 may detect one hundred x, y, z readings of acceleration values each second. In this regard, the accelerometer of the positioning sensor 72 may provide the speed estimator 77 with 512 acceleration values (also referred to herein as data samples) every 5.12 seconds at a sampling rate of 100 Hz corresponding to the sliding window of 512 samples. The acceleration values received by the speed estimator 77 from the accelerometer of the positioning sensor 70 may be included in one or more acceleration signals. Additionally, by applying an overlapping window of 50% the speed estimator 77 may receive the output of the acceleration signals from the accelerometer of the positioning sensor 72 twice as fast. For instance, in this example embodiment, the speed estimator 77 may receive the output of the acceleration values from the accelerometer of the positioning sensor 72 every 2.56 seconds (e.g., 50%×5.12 seconds=2.56 seconds). Although a sampling rate of 100 Hz may be utilized in this example embodiment, the sampling rate may correspond to any other suitable sampling rate without departing from the spirit and scope of the invention.

Upon receipt of one or more acceleration signals from the accelerometer of the positioning sensor 72, the speed estimator 77 may transform the acceleration signals to one or more corresponding frequency components of the acceleration signals by utilizing Fast Fourier Transform (FFT). In this manner, the speed estimator 77 may determine frequency components of to the acceleration signals. Additionally, the speed estimator 77 may determine the mean value or the overall magnitude of the frequency components to obtain the spectrum of the frequency components. The speed estimator 77 may utilize the spectrum of the frequency components in part to determine speed estimation. For instance, the speed estimator 77 may utilize up to 11.7 Hz of the spectrum of frequency components since human motion (e.g., the speed of a person walking) is generally represented accurately at low frequencies.

The speed estimator 77 may also add the frequency components (e.g., adding squared frequency magnitudes of the frequency components) to determine the energy of the spectrum. The energy of the spectrum may denote the intensity in which a user is cyclically moving (e.g., walking) with the apparatus 50. As such, in one example embodiment, the spectral energy may represent intensity of cyclic motion (e.g., walking) and the shape of the spectrum may represent the manner in which a user moves (e.g., walks) and/or where the apparatus 50 is placed on the body of the user. In this manner, the speed estimator 77 may utilize the spectrum of frequency components and the determined energy in part to determine or estimate the speed of a user cyclically moving (e.g., walking) with the apparatus 50.

In one example embodiment, the speed estimator 77 may utilize the spectrum of frequency components and the determined energy to determine a spectrum distribution that more closely matches or resembles a speed associated with the training data. The corresponding speed (e.g., 3 mph) associated with a spectrum distribution of the training data that most closely matches or resembles the spectral frequency and the energy associated with movement of a user with the apparatus 50 may be estimated, by the speed estimator 77, as the speed (e.g., 3 mph) of movement (e.g., walking) of the user with the apparatus 50.

In an example embodiment, the pose classifier 75 may also receive the one or more acceleration signals corresponding to the acceleration values from the accelerometer of the positioning sensor 72. As described above, in one example embodiment, the acceleration signals may relate to 512 acceleration values (data samples) in an instance in which a sliding window of 512 samples with a 50% overlap between subsequent windows is utilized at a sample rate of 100 Hz, for example.

In this regard, in response to receipt of the one or more acceleration signals by the pose classifier 75 from the accelerometer of the positioning sensor 72, the pose classifier 75 may determine a gravity vector based in part on the x, y, z, acceleration values (e.g., x, y, z values of the 512 acceleration values) of the acceleration signals. For example, the pose classifier may average the x, y, z values (e.g., $a_x$, $a_y$, $a_z$) of the acceleration signals to determine a gravity vector (e.g., $g_x$, $g_y$, $g_z$). The pose classifier 75 may utilize the gravity vector to transform triaxial (e.g., x, y, z) acceleration values (e.g., acceleration values in three-dimensions) into two components of the acceleration. The first component is a horizontal component of the acceleration (also referred to herein as horizontal acceleration component) and the second component is a vertical component of the acceleration (also referred to herein as vertical acceleration component). Additionally, based in part on gravity components of the gravity vector (e.g., $g_x$, $g_y$, $g_z$), the pose classifier 75 may compute a gravity tilt feature vector (also referred to herein as gravity tilt vector) associated with a tilt angle of the apparatus 50. In this regard, the pose classifier 75 may determine or detect a device pose(s) of the apparatus 50 based, in part on the horizontal acceleration component, the vertical acceleration component and the gravity tilt vector. In an example embodiment, the device poses may correspond to an in hand device pose, an at ear device pose, an in pocket (e.g., a trouser pocket) device pose, an in bag (e.g., backpack) device pose and any other suitable device poses. In one example embodiment, some of the device poses may be associated with a canonical tilt angle which may be detected by the pose classifier 75 based on analyzing a gravity tilt feature vector. The detected tilt angle may be utilized in part to determine a device pose of the apparatus 50, as described more fully below.

The decomposition into horizontal and vertical components may be due to the different oscillation patterns of a communication device such as, for example, apparatus 50 along the horizontal and vertical plane when it is placed in different positions of the body of the user. As such, for example, in an instance in which the apparatus 50 is in a trouser pocket, the horizontal movement may be much stronger than when it is in the user's hand.

For purposes of illustration and not of limitation, as an example of the pose classifier 75 utilizing, in part, the horizontal acceleration component, the vertical acceleration component and the gravity tilt vector to determine/detect a device pose of the apparatus 50 consider an instance in which the apparatus 50 is placed in a pocket (e.g., a trouser pocket) of a user while the user moves cyclically (e.g., walks) with the apparatus 50. In this example, the pose classifier 75 may detect the motion of a leg of the user often while the apparatus 50 is in the pocket (e.g., the trouser pocket) and may determine that the motion is a horizontal motion based on analyzing the horizontal acceleration component. On the other hand, the pose classifier 75 may determine that there is not much vertical motion while the apparatus 50 is in the pocket (e.g., the trouser pocket) of the user based on analyzing the vertical acceleration component. Additionally, based in part on analyzing the gravity tilt vector, the pose classifier 75 may determine that the apparatus 50 is not positioned with its front or back pointing downwards (e.g., at a downward tilt angle) while the apparatus 50 is inside a pocket (e.g., a trouser pocket). As such, in this example, the pose classifier 75 may analyze the horizontal acceleration component, the vertical acceleration component and the gravity tilt vector to determine that the current device pose of the apparatus 50 corresponds to an in pocket (e.g., trouser pocket) device pose.

As another example, for purposes of illustration and not of limitation, in an instance in which the apparatus 50 is placed at an ear of a user while the user moves cyclically (e.g., walks), the pose classifier 75 may analyze the horizontal acceleration component and may determine that there is minimal horizontal motion associated with the placement of the apparatus 50. The pose classifier 75 may detect minimal horizontal motion in this instance since there may not typically be much horizontal motion when a communication device such as apparatus 50 is placed at an ear. On the other hand, the pose classifier 75 may analyze the vertical acceleration component and may detect a vertical motion corresponding to the user placing the apparatus 50 at an ear when making a phone call, listening to audio or the like, for example. In addition, the pose classifier 75 may analyze the gravity tilt vector and may detect a slight tilt angle outward from the face of the user. The pose classifier 75 may detect the slight tilt angle since a communication device is mostly upright with a slight tilt angle outward from the face when a user makes a phone call and places the communication device at the ear. As such, in this example embodiment, the pose classifier 75 may analyze the horizontal acceleration component, the vertical acceleration component and the gravity tilt vector to determine that the current device pose of the apparatus 50 corresponds to an at ear device pose.

In an alternative example embodiment, in addition to the information associated with the horizontal acceleration component, the vertical acceleration component and the gravity tilt vector, the pose classifier 75 may also receive data from the proximity sensor 38. In this regard, the pose classifier 75 may utilize the data received from the proximity sensor 38, in part, to determine a device pose of the apparatus 50. As described above, the proximity sensor 38 may emit an electromagnetic field or a beam of electromagnetic radiation and may detect changes in the electromagnetic field or a return signal to identify an object(s) within a proximity of the proximity sensor 38. As such, for example, in an instance in which the proximity sensor 38 detects a nearby object(s), the proximity sensor 38 may provide an indication of the detection of the pose classifier 75. The pose classifier 75 may analyze data of the indicated detection in part to determine a pose of the apparatus 50. As an example, in an instance in which the indicated detection relates to a detection of an object(s) such as, for example, a hand, an ear, a cheek, etc., the pose classifier 75 may utilize this information to determine the device pose of the apparatus 50. In this regard, for example, in an instance in which the pose classifier 75 determines that the indicated detection corresponds to detection of a nearby object such as an ear, the pose classifier 75 may utilize this information in part to determine that the device pose of the apparatus 50 is an in ear device pose.

In another alternative example embodiment, the speed estimator 77 and pose classifier 75 may receive information from a gyroscope of the orientation module 71 during respective windows (e.g., a sliding window(s)) and may utilize this information in part to determine speed of a user moving (e.g., walking) with an apparatus 50 and/or the device pose of the apparatus 50. For instance, the information received from the gyroscope of the orientation module 71 may denote or identify an orientation of the apparatus 50 and/or one or more turns or maneuvers of the apparatus 50 while the user is moving with the apparatus 50. The speed estimator 75 may utilize the information from the gyroscope of the orientation module 71 along with the acceleration values (e.g., acceleration signals) from the accelerometer of the positioning sensor 72 to more efficiently and reliably determine the speed of movement (e.g., walking) of the user with the apparatus 50. In addition, the pose classifier 75 may utilize the information from the gyroscope of the orientation module 71 along with the horizontal and vertical acceleration components and the gravity tilt vector associated with the acceleration values (e.g., acceleration signals) to more efficiently and reliably determine the device pose of the apparatus 50. For example, an orientation of the apparatus 50 detected by the pose classifier 75 based on the information from the gyroscope of the orientation module 71 may assist the pose classifier 75 in determining a tilt angle of the apparatus 50. The determined tilt angle may be utilized by the pose classifier 75 in part to determine a device pose of the apparatus 50.

In one alternative example embodiment, the speed estimator 77 and/or the pose classifier 75 of the activity recognition module 78 may analyze data samples (e.g., acceleration values of acceleration signals) from the accelerometer of the positioning sensor 72 across multiple windows, in a combined manner, as opposed to considering one single sliding window of data samples (e.g., 512 data samples) independently of another sliding window. In this manner, the speed estimator 77 may analyze the data samples (e.g., acceleration values of data signals) of the multiple windows together to determine a speed estimation of cyclic movement (e.g., walking) of a user carrying an apparatus 50. In addition, the pose classifier 75 may also analyze the data samples of the multiple windows together to determine a device pose of the apparatus 50. By analyzing data samples over multiple windows together in a combined manner, the activity recognition module 78 may achieve accurate results and may conserve energy (e.g., battery power) by spreading out or minimizing the amount of sampling as opposed to sampling for each second of each minute.

Referring now to FIG. 3, a flowchart of an example method for determining a speed of cyclic motion of a device or user and one or more poses of a device according to an example embodiment is provided. At operation 300, the apparatus 50 may include means, such as the speed estimator 77, the processor 70 and/or the like for receiving one or more determined acceleration values (e.g., acceleration signals) during one or more time periods (e.g., one or more sliding windows or a combined window) in response to detected cyclic motion (e.g., walking) of a user moving with an apparatus (e.g., apparatus 50). The determined acceleration values may be received from an accelerometer of a positioning sensor 72. At operation 305, the apparatus 50 may include means, such as the speed estimator 77, the processor 70 and/or the like for transforming the acceleration values to one or more corresponding frequency components (e.g., spectral frequency components) associated with the acceleration values. In one example embodiment, the speed estimator 77 and/or processor 70 may utilize Fast Fourier Transform to transform the acceleration values to frequency components. In response to transforming the acceleration values to frequency components the speed estimator 77 and/or the processor 70 may add or sum the frequency components to determine the energy of the frequency components.

At operation 310, the apparatus 50 may include means, such as the speed estimator 77, the processor 70 and/or the like for determining a speed of the cyclic motion of the user based in part on comparing a spectrum of the frequency components to one or more spectrums of distribution associated with respect to one or more speeds of training data. In an example embodiment, the speed estimator 77 and/or the processor 70 may also utilize the determined energy of the frequency components in determining the speed of cyclic motion of the user. Optionally, at operation 315, the apparatus 50 may include means, such as the pose classifier 75, the processor 70 and/or the like for determining a device pose of the apparatus, among a plurality of predefined device poses, based in part on analyzing horizontal and vertical acceleration components. The horizontal and vertical acceleration components may be associated with the acceleration values. The device pose may corresponds to a placement or an orientation of the apparatus 50 in relation to the user during the cyclic motion (e.g., walking) of the user moving with the apparatus 50.

It should be pointed out that FIG. 3 is a flowchart of a system, method and computer program product according to an example embodiment of the invention. It will be understood that each block of the flowchart, and combinations of blocks in the flowchart, can be implemented by various means, such as hardware, firmware, and/or a computer program product including one or more computer program instructions. For example, one or more of the procedures described above may be embodied by computer program instructions. In this regard, in an example embodiment, the computer program instructions which embody the procedures described above are stored by a memory device (e.g., memory device 76) and executed by a processor (e.g., processor 70, speed estimator 77, pose classifier 75). As will be appreciated, any such computer program instructions may be loaded onto a computer or other programmable apparatus (e.g., hardware) to produce a machine, such that the instructions which execute on the computer or other programmable apparatus cause the functions specified in the flowchart blocks to be implemented. In one embodiment, the computer program instructions are stored in a computer-readable memory that can direct a computer or other programmable apparatus to function in a particular manner, such that the instructions stored in the computer-readable memory produce an article of manufacture including instructions which implement the function(s) specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus implement the functions specified in the flowchart blocks.

Accordingly, blocks of the flowchart support combinations of means for performing the specified functions. It will also be understood that one or more blocks of the flowchart, and combinations of blocks in the flowchart, can be implemented by special purpose hardware-based computer systems which perform the specified functions, or combinations of special purpose hardware and computer instructions.

In an example embodiment, an apparatus for performing the method of FIG. 3 above may comprise a processor (e.g., the processor 70, the speed estimator 77, the pose classifier 75) configured to perform some or each of the operations (300-315) described above. The processor may, for example, be configured to perform the operations (300-315) by performing hardware implemented logical functions, executing stored instructions, or executing algorithms for performing each of the operations. Alternatively, the apparatus may comprise means for performing each of the operations described above. In this regard, according to an example embodiment, examples of means for performing operations (300-315) may comprise, for example, the processor 70 (e.g., as means for performing any of the operations described above), the speed estimator 77, the pose classifier 75 and/or a device or circuitry for executing instructions or executing an algorithm for processing information as described above.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A method comprising:
receiving one or more determined acceleration values during one or more time periods in response to detected cyclic motion of a user moving with an apparatus;
transforming the acceleration values to one or more corresponding frequency components associated with the acceleration values; and
determining, via a processor, a speed of the cyclic motion of the user based in part on comparing a spectrum of the frequency components to one or more spectrums of distribution associated with respective one or more speeds of training data.

2. The method of claim 1, wherein the cyclic motion comprises walking.

3. The method of claim 1, wherein transforming the acceleration values to the frequency components further comprises summing the frequency components to determine an energy of the frequency components.

4. The method of claim 1, wherein determining the speed further comprises selecting a speed among the speeds of the training data based in part on the spectrum of the frequency components most closely matching one of the spectrums of distribution associated with the selected speed of the training data.

5. The method of claim 1, further comprising:
determining a device pose of the apparatus, among a plurality of predefined device poses, based in part on analyzing horizontal and vertical acceleration components associated with the acceleration values, the device pose corresponds to a placement or an orientation of the apparatus in relation to the user during the cyclic motion of the user moving with the apparatus.

6. The method of claim 5, wherein the acceleration values comprise triaxial acceleration values comprising acceleration data in three-dimensions.

7. The method of claim 6, wherein prior to determining the device pose, the method further comprises:
determining the horizontal and vertical acceleration components based in part on analyzing a gravity vector determined based in part on the triaxial acceleration values.

8. The method of claim 7, wherein determining the device pose of the apparatus further comprises analyzing a gravity tilt vector indicating at least one tilt angle of the apparatus.

9. The method of claim 8, wherein prior to determining the device pose of the apparatus, the method further comprises:
detecting the analyzed gravity tilt vector based in part on analyzing a plurality of gravity components of the gravity vector, the gravity components are associated with the triaxial acceleration values.

10. An apparatus comprising:
at least one processor; and
at least one memory including computer program code configured to, with the at least one processor, cause the apparatus to perform at least the following:
receive one or more determined acceleration values during one or more time periods in response to detected cyclic motion of a user moving with the apparatus;
transform the acceleration values to one or more corresponding frequency components associated with the acceleration values; and
determine a speed of the cyclic motion of the user based in part on comparing a spectrum of the frequency components to one or more spectrums of distribution associated with respective one or more speeds of training data.

11. The apparatus of claim 10, wherein the cyclic motion comprises walking.

12. The apparatus of claim 10, wherein the memory and computer program code are configured to, with the processor, cause the apparatus to:
transform the acceleration values to the frequency components by summing the frequency components to determine an energy of the frequency components.

13. The apparatus of claim 10, wherein the memory and computer program code are configured to, with the processor, cause the apparatus to:
determine the speed by selecting a speed among the speeds of the training data based in part on the spectrum of the frequency components most closely matching one of the spectrums of distribution associated with the selected speed of the training data.

14. The apparatus of claim 10, wherein the memory and computer program code are configured to, with the processor, cause the apparatus to:
determine a device pose of the apparatus, among a plurality of predefined device poses, based in part on analyzing horizontal and vertical acceleration components associated with the acceleration values, the device pose corresponds to a placement or an orientation of the apparatus in relation to the user during the cyclic motion of the user moving with the apparatus.

15. The apparatus of claim 14, wherein the acceleration values comprise triaxial acceleration values comprising acceleration data in three-dimensions.

16. The apparatus of claim 15, wherein prior to determine the device pose, the memory and computer program code are configured to, with the processor, cause the apparatus to:
determine the horizontal and vertical acceleration components based in part on analyzing a gravity vector determined based in part on the triaxial acceleration values.

17. The apparatus of claim 16, wherein the memory and computer program code are configured to, with the processor, cause the apparatus to:
  determine the device pose of the apparatus by analyzing a gravity tilt vector indicating at least one tilt angle of the apparatus.

18. The apparatus of claim 17, wherein prior to determine the device pose of the apparatus, the memory and computer program code are configured to, with the processor, cause the apparatus to:
  detect the analyzed gravity tilt vector based in part on analyzing a plurality of gravity components of the gravity vector, the gravity components are associated with the triaxial acceleration values.

19. A computer program product comprising at least one non-transitory computer-readable storage medium having computer-readable program code portions stored therein, the computer-readable program code portions comprising:
  program code instructions configured to cause receipt of one or more determined acceleration values during one or more time periods in response to detected cyclic motion of a user moving with an apparatus;
  program code instructions configured to transform the acceleration values to one or more corresponding frequency components associated with the acceleration values; and
  program code instructions configured to determine a speed of the cyclic motion of the user based in part on comparing a spectrum of the frequency components to one or more spectrums of distribution associated with respective one or more speeds of training data.

20. The computer program product of claim 19, further comprising:
  program code instructions configured to determine a device pose of the apparatus, among a plurality of pre-defined device poses, based in part on analyzing horizontal and vertical acceleration components associated with the acceleration values, the device pose corresponds to a placement or an orientation of the apparatus in relation to the user during the cyclic motion of the user moving with the apparatus.

\* \* \* \* \*